United States Patent [19]
Petersson

[11] 3,985,529
[45] Oct. 12, 1976

[54] METHOD FOR THE PRODUCTION OF LIQUID SULPHUR DIOXIDE

[75] Inventor: Stig Arvid Petersson, Skelleftehamn, Sweden

[73] Assignee: Boliden Aktiebolag, Stockholm, Sweden

[22] Filed: Oct. 7, 1974

[21] Appl. No.: 512,948

[30] Foreign Application Priority Data
Oct. 15, 1973  Sweden .......................... 7313965

[52] U.S. Cl. .................................. 62/17; 55/73; 423/542; 423/543; 62/23
[51] Int. Cl.$^2$ ............................................. F25J 3/08
[58] Field of Search ............... 62/17, 114, 112, 476, 62/497, 20; 55/26, 54, 73, 84, 89; 423/542, 543

[56] References Cited
UNITED STATES PATENTS

| | | | |
|---|---|---|---|
| 2,111,389 | 3/1938 | Merriam | 423/542 |
| 2,963,875 | 12/1960 | Mills | 62/497 |
| 3,733,779 | 5/1973 | Bellisio et al. | 55/73 |

Primary Examiner—Frank W. Lutter
Assistant Examiner—Frank Sever
Attorney, Agent, or Firm—Stevens, Davis, Miller & Mosher

[57] ABSTRACT

The method of recovering liquid sulphur dioxide from gases containing sulphur dioxide by washing with water in an absorption plant and then stripping off absorbed sulphur dioxide at subatmospheric pressure. Water is removed from the stripped gases by cooling and drying and sulphur dioxide is removed by condensation. The whole system is kept at a subatmospheric pressure by pumping off residual gases after the sulphur dioxide condensation.

8 Claims, 1 Drawing Figure

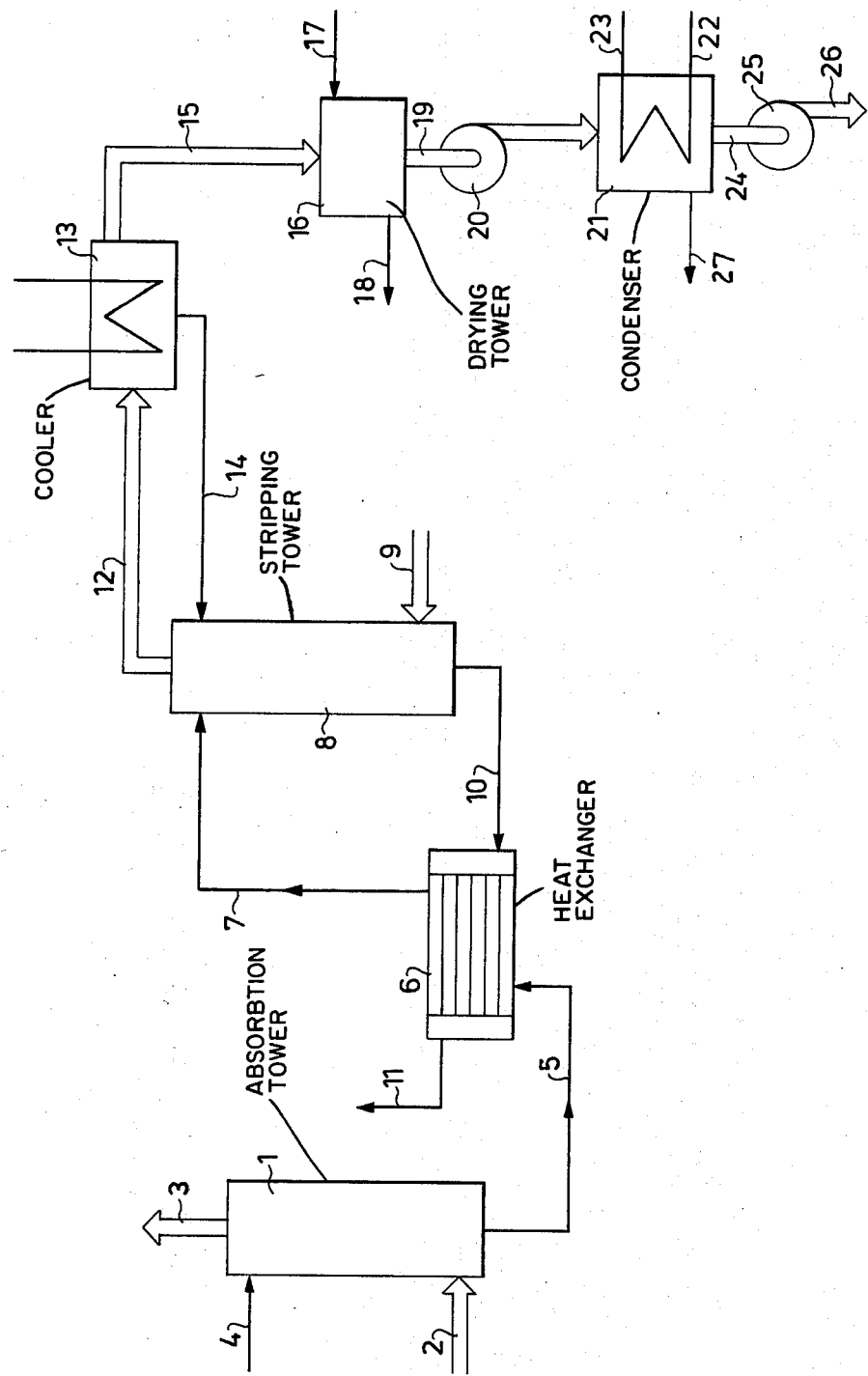

METHOD FOR THE PRODUCTION OF LIQUID SULPHUR DIOXIDE

The invention refers to a process for the extraction of liquid sulphur dioxide from waste gases by firstly absorbing the sulphur dioxide in cold water and then stripping the sulphur dioxide by subatmospheric pressure and finally condensing the pure sulphur dioxide gas by means of cooling in a vacuum where the vacuum is established by pumping out residual gases after the condensation of sulphur dioxide.

Liquid sulphur dioxide is used inter alia in the preparation of bleaching agents for the cellulose industry and for the production of sulphuric acid. Both of these require a high degree of purity in the sulphur dioxide and therefore impurities in the roaster gases must be removed otherwise they would be passed on with the condensed sulphur dioxide obtained.

Liquid sulphur dioxide is normally prepared from roaster gases formed during the combustion of substances containing sulphur. Normally these gases consist of waste gases from the roasting of sulphides, but also gases from the combustion of pure sulphur are used. In the roasting of metal sulphides in air a gas with a sulphur dioxide content varying from 2–16% is normally obtained. To increase the sulphur dioxide content oxygen-enriched air can be used in the roasting process so that the sulphur dioxide content of the gases can be considerably increased. Several methods of concentrating gases containing sulphur dioxide and of converting them to liquid sulphur dioxide are known.

A method of preparing liquid sulphur dioxide from roaster gases with 6–7% $SO_2$ is shown in Ullman Encyklopaedie der Technischen Chemie (1964) volume 15, page 420. In the method described here the entire amount of roaster gases is cooled to approximately −60° C with pressure being raised at the same time so that $SO_2$ is condensed. The method is expensive since it requires a great deal of energy. In addition, the apparatus required for the process is both costly and complicated because of the high pressure involved.

Another method starting from roaster gases with low levels of sulphur dioxide is described in Kemisk Tidskrift No. 1, 1970, page 34–40. By this method the roaster gases are first passed through an absorption tower where sulphur dioxide is absorbed by cold water (5°–10° C), after which the sulphur dioxide is stripped with steam in a stripper, dried by means of sulphuric acid and then transformed into a liquid either by compression to approx. 4 bars or by cooling at atmospheric pressure to approx. −15° C. This method is more economic than the method mentioned above on condition that cold water for absorption is available.

A similar method to the one described above is given in Kirk-Othmer, volume 19, page 414, but with the difference that $SO_2$ gas in this case is absorbed by dimethyl aniline.

The German Pat. No. 1 667 745 gives a method of concentrating gas containing sulphur dioxide which embraces absorption with cold water and desorption at steadily falling pressure whereby the sulphur dioxide which is stripped at the lowest pressure is, in counterflow with successively increasing pressure, allowed to pass the various stripping steps and where pumps have been placed between the various steps to raise progressively the pressure of the sulphur dioxide.

The Swedish Pat. No. 167 993 shows a method of collecting the sulphur dioxide content as liquid sulphur dioxide from the exhaust gases of a sulphite boiler. In this case the exhaust gases are cooled to condensation in a series of heat exchangers. Sulphur dioxide is washed out of the boiler gases by means of cold water under pressure. Sulphur dioxide gas is then stripped at a pressure lower than the boiling pressure - but not at atmospheric pressure - in a heat exchanger before being dried and condensed by cooling in a heat exchanger after compression.

The German Pat. No. 1 567 462 shows a method which embraces the stripping of sulphur dioxide gas from the rinsing water in a vacuum with simultaneous heating and concentration of the sulphur dioxide in the gas by leading the steam into several stages in which pressure and temperature in the gas are progressively increased. By increasing the pressure the steam is condensed. The method, however, requires great quantities of energy and the consumption of steam is given at 5.35 tons per ton of $SO_2$ produced.

In the German Auslegeschrift No. 1 769 303 a method of gas purification is described whereby sulphur dioxide is stripped in a vacuum. The method is applied without the addition of steam from the outside to strip the sulphur dioxide so that very low stripping pressures are required. In addition the entire quantity of gas is pumped through the vacuum pump. For large volumes of gas the apparatus is very space-consuming and the vacuum pumps require a very great deal of energy. The method has thus proven to be less suitable for use with the large volumes of gas which the production of liquid sulphur dioxide on an industrial scale involves.

The disadvantage of these earlier known methods is thus, that they require a great deal of energy, especially where cold water for the absorption of $SO_2$ is not available.

It has, however, now been surprisingly discovered that liquid sulphur dioxide can be recovered from combustion gases in a simple and economic way. The combustion gases which had previously been passed through a dust cleaning process, are then passed through an absorption tower where the sulphur dioxide is absorbed by water. The method is characterized in that the sulphur dioxide absorbed and dissolved in the water is stripped at a pressure below atmospheric pressure and at a temperature between 15°–98° C in a stripper by injecting steam, in that the moist sulphur dioxide gas is thereafter cooled in a heat exchanger with cold water or by means of some other cooling agent such as, for example, liquid sulphur dioxide, whereby most of the water in the gas is condensed, in that the gas purified by water is further dried with sulphuric acid, in that the sulphur dioxide is condensed by means of cooling in a heat exchanger and that the entire system is thus kept at subatmospheric pressure in the various stages by having condensed the water and the sulphur dioxide and by pumping away the residual gases after the condensation of the sulphur dioxide. The water condensed from the moist sulphur dioxide can subsequently be returned to the stripper stage for the removal of dissolved sulphur dioxide.

The method described means a considerable saving of energy above all due to the fact that steam consumption is low when stripping $SO_2$ in a vacuum. In addition, the volume of residual gases which must be pumped away is very small so that the whole system can be kept under a vacuum with a relatively small vacuum pump with low energy consumption. The residual gases which are saturated with sulphur dioxide can be returned to the absorption tower.

The invention also refers to a method whereby an auxiliary vacuum pump is inserted before the condenser. By doing so, it is possible to work with higher pressure in the condenser, though still preferably below atmospheric pressure. This means that the cooling temperature of the liquid sulphur dioxide formed in the condenser can be raised. A great advantage of the invention is that so-called low-value calories such as waste heat in the form of hot water or steam at low pressure can be used in the stripper stage.

A plant designed for use in the production of sulphuric acid from sulphides consists of an absorption tower to which the gas containing sulphur dioxide is led and where the sulphur dioxide is absorbed by cold water. The tower can suitably be lined with acid-resistant tiling and filled with plastic filling members such as polypropylene, or some ceramic material. Even other types of absorption tower such as the bubble-cap column can be used but material problems are then, naturally, a limiting factor. In the upper part of the tower a drop separator has been placed to prevent drops being entrained with the washed gas.

After the stripping tower the water is treated in a stripping tower which, like the absorption tower, suitably consists of a tower lined with acid-resistant tiling. The tower is suitably filled with filling members of plastic or some ceramic material.

Before the sulphur dioxide is expelled in the stripping tower it can be useful to heat exchange the water against the outgoing heated water from the stripping tower in, for example, a flat heatplate exchanger of acid-resistant steel, titanium or palladium titanium.

The gas containing sulphur dioxide stripped from the water is thereafter cooled in, for example, a heat exchanger of acid-resistant steel, titanium or palladium titanium.

The cooled gas is then dried by means of sulphuric acid in a drying tower preferably filled with filling members. As an alternative a bubble cup column can also be used but this, however, gives a greater drop in pressure.

After the washing operation the sulphur dioxide is condensed in a cooler by means of a suitable cooling agent, for example, freon. The cooler consists suitably of devices for the supply of liquid freon, for example a screw compressor and a condenser for the cooling agent together with a condenser for the sulphur dioxide separated from the cooling agent system. Tube heat exchangers make the best condensers for this purpose.

Finally, a pump arrangement is made to take away gases still uncondensed such as sulphur dioxide, nitrogen and oxygen, as well as other gases inert in the process. The residual gases are returned to the absorption tower.

A similar pump can be arranged between the drying tower and the condenser so as to raise the pressure slightly since condensation can then take place at higher temperature. Since the entire mass of the gas is transported through this pump the pressure increase should be relatively small so as to avoid unnecessary losses of energy.

The invention is illustrated in closer detail in the accompanying FIGURE.

This shows schematically the method of the present invention whereby gas containing sulphur dioxide is led to an absorption tower 1 via conduit 2 and purified gas is led off via conduit 3. Cold water for absorbing the sulphur dioxide is supplied to the absorption tower via conduit 4 and led away via conduit 5 to a heat exchanger 6 and further via conduit 7 to a stripping tower 8 to which steam is supplied via conduit 9. The heated water is led away from the stripping tower 8 via conduit 10 to a heat exchanger 6 and then away from the heat exchanger via conduit 11. Gas containing sulphur dioxide is led away from the stripping tower 8 via conduit 12 to a cooler 13 where part of the water vapor coming from the stripping tower 8 is condensed and returned to the stripping tower via conduit 14. The cooled gas is led via conduit 15 to a drying tower 16 to which sulphuric acid is supplied via conduit 17 and led off via conduit 18. The dried gas is thereafter led via conduit 19, possibly via an auxiliary vacuum pump 20, to a condenser 21 to which the cooling agent is supplied via conduit 22 and led off via conduit 23. The gases not condensed are led off via conduit 24 to a vacuum pump 25. The residual gases are suitably led away from the vacuum pump via conduit 26 to the absorption tower 1 and the condensed sulphur dioxide is led off from the condenser 21 via conduit 27.

The invention can be illustrated by the following example: (Example No. 3 in the presentation below). To the top of the stripping column approximately 1100m³/h 1.5% $SO_2$-water at a temperature of approximately 70° C is supplied. By the instantaneous evaporation of part of the water and $SO_2$ the temperature falls to approximately 63° C which is the temperature of the stripped $SO_2$ gas when it leaves the stripping column. Pressure in the column can, for instance, be approximately 235 mm Hg at top and approximately 240 mm Hg at the bottom. The temperature at the bottom of the column will then be approximately 72° C, which corresponds to saturated water vapor at approximately 240 mm Hg. Heat for the stripping is supplied in the form of steam - injected directly in - to the bottom of the stripping column.

A gas with p $H_2O$ = 170 mm Hg and p $SO_2$ = 65 mm Hg emerges from the stripping column. This corresponds to approximately 16 t/h $SO_2$ and approximately 11.8 t/h $H_2O$ or 5600 and 14700 Nm³/h respectively.

In the reflux condenser 13 the gas is cooled to approximately 5° C with cold water, whereby most of the water in the gas is condensed leaving a residual water content of only 150 kg/h. Approximately 5.8 tons of water is thus condensed and returned to the stripping column.

To the sulphuric acid drier is led 15 tons/h $SO_2$ and 150 kg/h water vapor whereby the water vapor is removed completely and the dry gas is led to the $SO_2$-condenser where the temperature is reduced to approximately −45° C at which liquid sulphur dioxide is formed. The purpose of the vacuum pump attached to the condenser is to remove the residual gases $SO_2$, $O_2$, $N_2$ and $CO_2$ and to keep pressure in the condenser at approximately 150 mm Hg. The residual gas which consists largely of $SO_2$ (p$SO_2$ = 119 mm Hg) is returned to the absorption tower 1. The volume of this residual gas is approximately 200 m³/h of which 147 m³/h is $SO_2$.

Normal steam consumption in conventional methods of stripping $SO_2$ from water containing 0.5 - 2.0 % is between 3 and 6 tons steam per ton of $SO_2$-gas stripped.

In the method described above steam consumption is only 1-1.5 tons of steam per ton $SO_2$.

In the following comparative examples the data from different tests made in a plant constructed in accordance with the above presentation is tabulated. Example 3 is identical with the test described above. The Figures thus represent this test and three others with slightly different parameters.

Comparative Examples

| Example | 1 | 2 | 3 | 4 |
|---|---|---|---|---|
| Temp. of water supplied to stripper °C | 35 | 48 | 70 | 95 |
| Pressure in stripper top mm Hg | 42 | 85 | 235 | 755 |
| Pressure in stripper bottom mm Hg | 47 | 90 | 240 | 760 |
| Temp. outgoing vapor °C | 28 | 41 | 63 | 92 |
| Temp. stripper bottom °C | 37 | 50 | 72 | 100 |
| Pressure after reflux condenser mm Hg | 38 | 65 | 200 | 700 |
| Pressure after $H_2SO_4$ drying | 35 | 45 | 160 | 600 |
| Pressure after $SO_2$-condensation mm Hg | 27 | 35 | 100 | 500 |
| Condensation temperature in $SO_2$ condenser °C | −74 | −65 | −50 | −25 |
| Weight of $SO_2$ from stripper kg/h | 16000 | 16000 | 16000 | 16000 |
| Weight $H_2O$ from stripper kg/h | 9400 | 10500 | 11800 | 13700 |
| Weight $H_2O$ to $H_2SO_4$ drying kg/h | 930 | 500 | 150 | 43 |

From the Table it is seen that the method according to the invention can be applied with different parameters relating to pressure, temperature and quantity of heat. Comparative Example 1 details process data working with low pressures in the system. This means that a smaller amount of water is stripped from the stripper which must be condensed in the reflux condenser and that a large amount larger of water must be absorbed by the sulphuric acid in the sulphuric acid drying process. In addition the gas must be cooled to a low temprature in order to be condensed but this can be recompensed by using excess heat in the form of water or steam at a low pressure. With higher pressure in the system the temperature of the sulphur dioxide cooler can be raised and the quantity of water absorbed by the sulphuric acid be reduced. Energy costs on the other hand are somewhat greater and more high-value calories must be used.

An optimum of temperature and pressure with respect to local conditions must therefore be reached. In certain cases sulphuric acid from a sulphuric acid plant is available and this product acid can then without any appreciable cost be used in the drying process by absorbing large quantities of water in the sulphuric acid. The diluted acid obtained in this way can thus be returned to the absorption stage in the sulphuric acid plant. In other cases the sulphuric acid must be evaporated and returned to the drying system after removal of water whereby a reduction in the quantity of water which must be absorbed by the sulphuric acid is naturally desirable. If an oxygen plant is available it will be possible to achieve cooling to low temperatures at reasonable costs which means that low temperatures in the sulphur dioxide condenser can be accepted. Thus, how the process variable are disposed so as to give optimum results depends on local conditions but whatever these may be the method in accordance with the invention still provides a flexible and economic process.

A further example will show a plant designed in accordance with the invention where liquid sulphur dioxide was recovered from the exhaust gases of an oil-fired heating-plant. The oil used contained 3% sulphur which gave a content of 0.2% by volume sulphur dioxide in the exhaust gas. In addition the exhaust gas consisted of 12% $CO_2$, 12 $H_2O$ and 75% $N_2$. The quantity of exhaust gas was $10^6$ $m^3h^{-1}$ at a temperature of 175° C. The exhaust gases were cooled to 50° C and this cooling was effected without condensation of any water. The cooling operation generated 50 tons of steam per hour. In a second cooling step the exhaust gases were further cooled to 30° C which resulted in 75 tons of condensed water per hour. The condensed water contained a small amount of sulphur dioxide and was treated with air to strip off this $SO_2$ whereafter the water was led to a recipient. The stripped gas was led to an absorption tower together with the rest of the cooled gases. The gases were treated in the absorption tower with a water solution of a citrate (1600 $m^3h^{-1}$), which have a considerably better $SO_2$ solubility in comparison with water without the addition of any buffering substance. After the absorption process, the absorption water containing sulphur dioxide at a temperature of 25° C was led by way of a heat-exchanger to a stripper where it was further heated with steam at the rate of 25 tons per hour to a temperature of 50° C. Pressure in the stripper was maintained at 120 torr. From the stripper the stripped gas was led to a condenser where the gas was cooled indirectly with water after which condensed water was returned to the stripper and the absorption water was returned to the absorption tower after heat exchanging with $SO_2$-containing absorption water which lowered the temperature from 55 to 22° C. The gas, which is now saturated with water vapour but at a lower temperature, is dried with sulphuric acid whereby a practically completely dry gas consisting of $SO_2$ and smaller quantities of inert gases is obtained. After the drying process the gas is cooled to a temperature of −60° C whereby 6 tons sulphur dioxide per hour is condensed and led off. After the sulphur dioxide is condensed the remaining gas is led off through a vacuum pump at normal pressure. This gas which is saturated with respect to sulphur dioxide, is returned to the absorption tower. This gas consisted of 6500 $m^3h^{-1}$ containing 10 tons $SO_2$ and 6 tons $CO_2$ per hour.

One of the advantages of returning the residual gas to the absorption tower is that the sulphur dioxide content makes the absorption fluid more acidic which reduces the solubility of carbon dioxide. This in turn reduces the amount of carbon dioxide in the stripped gas and thereby increases the amount of stripped sulphur dioxide proportionally.

I claim:

1. The method of recovering liquid sulphur dioxide from combustion gases containing sulphur dioxide comprising washing the gas with water in an absorption plant, so that the sulphur dioxide is absorbed by the washing water, introducing steam and said $SO_2$ absorbed in water into a stripping column maintained at a first pressure below atmospheric pressure and at a temperature between 15° and 98° C. whereby absorbed sulphur dioxide which contains water is stripped, cooling the steam treated watercontaining sulphur dioxide gas which is moist at a second pressure below atmospheric pressure so that the water condenses, further drying the gas by means of sulfuric acid, and liquefying the sulphur dioxide by condensing in a heat exchanger at below atmospheric pressure to further dry said gas, said first and second pressures being controlled by pumping off the residual gases after sulphur dioxide condensation.

2. The method in accordance with claim 1, wherein the condensed water is returned to the stripping column.

3. The method in accordance with claim 1, wherein the moist gas is cooled in a heat exchanger to a temperature between 0° and 10° C.

4. The method in accordance with claim 1, wherein the heat is exchanged between the out-going water from the stripping column and in-going water containing sulphur dioxide.

5. The method in accordance with claim 1, wherein an auxiliary pump is used to increase the pressure after drying with sulphuric acid but before the condensation of sulphur dioxide.

6. The method in accordance with claim 1, wherein the stripping takes place at a temperature of 30° to 70° C, preferably 40°–50° C.

7. The method in accordance with claim 1, wherein the residual gases are returned to the absorption tower.

8. The method in accordance with claim 1, wherein the further drying is effected by means of sulphuric acid.

* * * * *